United States Patent
Letschert et al.

(12)

(10) Patent No.: US 6,294,009 B1
(45) Date of Patent: Sep. 25, 2001

(54) TANTALUM (V) NITRIDE PIGMENT, PROCESS FOR PRODUCING IT AND ITS USE

(75) Inventors: Hans-Peter Letschert, Hanau; Wilfried Voigt, Rodenbach, both of (DE)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 0 days.

(21) Appl. No.: 09/453,461

(22) Filed: Dec. 2, 1999

(30) Foreign Application Priority Data

Dec. 17, 1998 (DE) .............................. 198 58 255

(51) Int. Cl.⁷ .............................. C01B 21/06; C09C 1/00; C03C 8/14
(52) U.S. Cl. ...................... 106/401; 106/400; 423/409; 524/408; 501/17
(58) Field of Search .................... 106/400, 401; 423/409; 524/408; 501/17

(56) References Cited

U.S. PATENT DOCUMENTS

| 5,376,349 | 12/1994 | Jansen et al. | 423/409 |
|---|---|---|---|
| 5,439,660 | 8/1995 | Jansen et al. | 423/263 |
| 5,569,322 | 10/1996 | Jansen et al. | 106/401 |
| 5,766,336 * | 6/1998 | Jansen et al. | 106/461 |

FOREIGN PATENT DOCUMENTS

| 43 17 421 | 12/1994 | (DE) . |
|---|---|---|
| 0 592 867 | 4/1994 | (EP) . |
| 62225960 | 3/1989 | (JP) . |

OTHER PUBLICATIONS

Von G. Brauer, J. Weidlein and J. Strähle, " Über das Tantalnitrid $Ta_3N_5$ und Das Tantaloxidnitrid TaON", Zeitschrift für anorganische und allgerueine Chemie. Band 348, 1966, pages 298–308 (no month).

Dr. G. Brauer and Dr. J. R. Weidlein, "Synthese und Eigenschaften des roten Tantalnitrids $Ta_3N_5$", Angewandte Chemie, de, VCH Verlagsgesellschaft, Weinheim, Band 77, 1965, pp. 218–219 (no month).

* cited by examiner

Primary Examiner—Anthony Green
(74) Attorney, Agent, or Firm—Wenderoth, Lind & Ponack, L.L.P.

(57) ABSTRACT

The invention relates to tantalum (V) nitride pigments with improved color values compared with predisclosed products, a process for producing such pigments and their use. According to the invention, pigments having an a* color value in the CIE Lab system of equal to/greater than 45, in particular equal to/greater than 50, are obtainable by after-treating a tantalum (V) nitride produced in a known manner in a salt melt at 100 to 600° C., in particular 300 to 500° C., in the course of 1 to 100 minutes, in particular 5 to 60 minutes. Preferably, the after treatment is carried out in an alkali-metal nitrate melt. The pigments can be used to color plastics and paints, and also enamel, glass and porcelain decorations.

15 Claims, No Drawings

TANTALUM (V) NITRIDE PIGMENT, PROCESS FOR PRODUCING IT AND ITS USE

BACKGROUND OF THE INVENTION

1. Field of the Invention

The invention relates to a process for producing tantalum (V) nitride pigments which are notable for a higher a* color value in the CIE Lab system than predisclosed tantalum(V) nitride pigments. The invention furthermore relates to-tantalum(V) pigments having an a* color value according to CIE Lab of equal to/greater than +45; such pigments are obtainable by the process according to the invention. A further subject of the application relates to the use of the pigments.

2. Description of Related Art

There is a need to replace known pigments which may liberate, during use or during waste disposal, for instance in refuse combustion, toxic or ecologically harmful heavy metals by those pigments which are safe. Such a safe pigment is tantalum(V) nitride whose color is reddish-orange to red. The tantalum(V) nitrides obtainable by known processes have too low an a* color value in the CIE Lab system (DIN 5033, Part 3) and, in addition, appear slightly grayish or brownish. In accordance with H. Moureau and C. H. Hamplet (J. Amer. Chem. Soc. 59, 33–40 (1937)), tantalum(V) nitride can be produced by ammonolysis of $TaCl_5$; the reaction times are very long and, in addition, a coloristically attractive product is not obtained. According to G. Brauer and J. R. Weidlein (Angew. Chem. 77, 218–219 (1965)), tantalum(V) oxide can be nitrided at 860 to 920° C. with ammonia. In copying the above-mentioned process, the inventors of the present application found that, despite prolonging the reaction time, no further color displacement from reddish brown to red takes place so that this product is also coloristically less attractive.

According to the process described in DE-OS 42 34 938, tantalum(V) nitride can be obtained by nitriding a tantalum (V) oxide hydrate at 750 to 950° C. with a shorter reaction time. The a* color values obtainable by this process on the basis of the test method described in said document was around +40. The a* color value was increased only by 2–3 units by thermal treatment of the $Ta_3N_5$ at 300° C. From a coloristic point of view, on the other hand, as high as possible an a* color value is desired, in particular a value above 45 and, particularly preferably, above 50.

SUMMARY OF THE INVENTION

Accordingly, the object of the present invention is to provide tantalum(V) nitride pigments having an a* color value according to CIE Lab (DIN 5033, Part 3) measured on a PVC film gelled for 10 minutes at 140° C. and having a pigment content of 26% by weight. A further object relates to providing a process for producing such pigments. A further object is to improve the known process for producing tantalum(V) nitrides by nitriding a tantalum(V) oxide, tantalum(V) oxide hydrate or tantalum(V) oxide nitride with ammonia so that the resultant pigment has a higher a* color value.

It was found that the a* color value and the color intensity (chroma value) can be increased in a surprising way by a treatment of the tantalum(V) nitride in a salt melt. The pigment quality of the tantalum(V) nitride thereby increases in an unforeseeable way.

Accordingly, the invention relates to a process for producing a tantalum(V) nitride pigment, comprising nitriding a tantalum(V) oxide, tantalum(V) oxide hydrate or tantalum (V) oxide nitride with ammonia at 500 to 1100° C. in the presence or absence of a flux, which is characterized in that the nitriding is carried out either in the presence of one or more water-soluble salts from the series comprising alkali-metal and alkaline-earth-metal nitrates, chlorides and carbonates or/and in that the nitriding product is treated before or after washing out optionally present flux in a salt melt having a melting point in the range from 100 to 600° C. for 1 to 100 minutes at 100 to 600° C. and then extracting the pigment by dissolving the salts in water. The dependent process claims relate to preferred embodiments of the process according to the invention.

The invention furthermore relates to tantalum(V) nitride pigments having an a* color value of equal to/greater than +45, defined in the CIE Lab system according to DIN 5033, Part 3 and measured on a PVC film gelled for 10 minutes at 140° C. and having a content of 26% by weight of pigment. The pigments according to the invention are obtainable by the process according to the invention.

The nitriding of a tantalum(V) oxide, oxide hydrate or oxide nitride can be carried out in a manner known per se by passing ammonia at 500 to 1100° C., preferably 750 to about 1000° C., over the tantalum compound for a plurality of hours. Expediently, the nitriding can be carried out in a rotating tube or in another device with which the reaction mixture to be nitrided is agitated for the purpose of exposing new particle surfaces. The nitriding can be carried out in the presence or absence of one or more fluxes, for example boric acid, boric anhydride and/or ammonium salts of boric acid, carbonic acid or lower carboxylic acids in accordance with DE-OS 42 34 938. Although tantalum(V) nitrides produced in the presence of such fluxes have a higher color intensity than those which are produced in the absence of such fluxes, a substantially higher color intensity is achieved by the after-treatment according-to the invention of the nitriding product in a salt melt. It was furthermore found that the nitriding can be carried out at a higher temperature than was hitherto assumed in view of the limited temperature stability of tantalum(V) nitride if the reaction takes place in the presence of an adequate amount of ammonia. As a result of a temperature increase which has become possible in this way, the reaction time can be reduced and the space/time yield can be increased. In relation to the details of the nitriding, reference is made to the above-mentioned literature.

DESCRIPTION OF THE PREFERRED EMBODIMENTS

In accordance with one embodiment, the nitriding is carried out in the presence of one or more water-soluble salts from the series comprising the alkali-metal and alkaline-earth-metal nitrates, chlorides and carbonates, in particular alkali-metal nitrates. Such salts can be used in an amount of at least 0.1% by weight, based on the tantalum compound to be nitrided, up to a multiple of the tantalum compound. Small amounts of such salts act in a similar way to predisclosed fluxes. As the amount of said salts increases, the entire reaction mixture becomes pasty to liquid so that the state of aggregation of the mixture has to be borne in mind during the nitriding. Expediently, in the case last mentioned, the nitriding takes place in an amount of a salt melt which is such that the viscosity of the melt in which the tantalum compound to be nitrided is suspended makes possible an adequately intensive contact between the solid Ta phase and the gas phase (ammonia).

In accordance with a preferred embodiment, the nitriding is carried out in a manner known per se and the nitriding is followed by the after-treatment in a salt melt. The after-treatment comprises introducing the nitriding product into the salt melt; after the introduction of the tantalum compound into the melt, the mixture is allowed to stand or, if necessary, stirred. The after-treatment can be carried out in an oxygen-containing, but preferably in an inert atmosphere, for example, nitrogen or, preferably, ammonia. The reaction time necessary to improve the quality of the tantalum(V) nitride pigment by treatment in the salt melt is 1 to 100 minutes, preferably 10 to 60 minutes, at a reaction temperature in the range from 100 to 600° C., preferably 300 to 500° C. It goes without saying that, as the reaction temperature increases, the reaction time can be reduced. In accordance with a particularly preferred embodiment of the process according to the invention, the treatment in the salt melt takes place at a temperature in the range from 300 to 500° C. in the course of a reaction time of 5 to 60 minutes, in particular 10 to 30 minutes.

The salt melt to be used in the process according to the invention for after-treating the tantalum(V) nitride is composed of one or more salts and/or metal hydroxides, the melting point of the salt or salt mixture being in the range from 100 to 600° C. Preferably, the melting point of the salt, hydroxide or mixture of such compounds is in the range from 200 to 400° C. With a view to a satisfactory separation of the pigment from the constituents of the salt melt, it is expedient that the salt melt is composed of such constituents which are essentially water-soluble. After completion of the treatment of the tantalum(V) nitride in the salt melt, the mixture can consequently be taken up in water, in which process the salts dissolve and the insoluble tantalum(V) nitride pigment, improved in its color values, can be separated from the aqueous phase and then dried.

Salt melts such as those used in preferred embodiments of the process according to the invention are essentially composed of one or more compounds from the series comprising the alkali-metal nitrates, alkaline-earth-metal nitrates, alkali-metal carbonates, alkali-metal and alkaline-earth-metal chlorides, alkali-metal hydroxides and boron oxide. The cations on which said salts and hydroxides are based are preferably lithium, sodium, potassium, magnesium, calcium, strontium and barium. In accordance with particularly preferred embodiments, the salt melt is composed of one or more alkali-metal nitrates or an alkali-metal nitrate in combination with an alkali-metal hydroxide. The increase in the a* color value and in the chroma value obtainable in the process according to the invention by after-treating the tantalum(V) nitride in a salt melt depends not only on the temperature and reaction time, but also on the choice of components of the salt melt. Whereas, for example, the greatest quality improvement using an approximately eutectic salt melt of $KNO_3/LiNO_3$ is achieved at a reaction temperature around 400° C., optimum values are obtained even at 350° C. using a salt mixture of $NaNO_3/LiNO_3$. Using the above-mentioned optimized salt mixtures, the after-treatment is preferably carried out at a temperature in the range from 350 to 450° C. within 10 to 60 minutes.

Strongly alkaline melts are less preferred since the a* color value is not increased or only slightly increased thereby.

If the tantalum(V) oxide nitride is to be used as a glass color or glass enamel, a glass composition which melts below 600° C. and which becomes a constituent of the pigment can also be used instead of a salt melt composed of water-soluble salts.

Table 1 shows some preferred binary salt melts with their melting points and the melting points of the individual components (values in brackets).

TABLE 1

| Salt 1 | Mol-% | Salt 2 | Intectic melting point (° C.) |
| --- | --- | --- | --- |
| $KNO_3$ | 35 | $LiNO_3$ | 132 |
| $NaNO_3$ | 50 | $LiNO_3$ | 208 |
| $NaNO_3$ | 50 | $KNO_3$ | 218 |
| $Li_2CO_3$ | 98 | $LiNO_2$ | 250 |

Using salt melts which contain water-soluble constituents, virtually no change in the particle size distribution of the tantalum nitride used occurs in the after-treatment according to the invention of tantalum nitride for the purpose of quality improvement. If, consequently, the nitriding product already has a suitable particle size distribution for pigment purposes, no further grinding process and/or sieving is necessary after the after-treatment according to the invention in the salt melt.

As emerges from the examples according to the invention, tanralum(V) nitride pigments according to the claims having an a* color value of equal to/greater than 45 and, preferably greater than 50, defined and measured as explained above, are readily obtainable by the process according to the invention, in particular by after-treatment of a tantalum nitride in a salt melt. The mechanism responsible for the improvement in the pigment quality made possible by the after-treatment is at present not yet known. A tantalum(V) nitride pigment having an a* color value of equal to/greater than 45 cannot be obtained by any of the predisclosed processes copied by the inventors of the present application. The invention consequently provides novel pigments with improved color properties.

The tantalum (V) nitride pigments obtainable according to the invention can be used to color plastics, for example extrudates, sheets and fibers, to color paints and other synthetic coatings, and furthermore to color enamel, glass and porcelain decorations. The term "glass decorations" also includes the coloring of constructional and hollow glass.

The advantages of the invention are that tantalum(V) nitride pigments are provided in improved pigment quality, as a result of which the spectrum of use is extended for such pigments. The pigments are obtainable by the simple process according to the invention. The after-treatment in the salt melt can also be applied to those tantalum(V) nitrides which have themselves an inadequate pigment quality but are possibly economically accessible.

The invention is explained further by reference to the examples below. However, the Examples are merely illustrative in nature and should not be construed to narrow the scope of the claims.

EXAMPLES

Preparation of the parent tantalum(V) nitride (VB): used in the examples according to the invention was a tantalum (V) nitride which was prepared by nitriding $Ta_2O_5$ with a $d_{50}$-value of about 0.4 μm and a $d_{90}$-value of about 1 μm with ammonia (120 l/h) in a rotating tube at 1000° C.; reaction time 10 hours.

General specification for after-treating a tantalum(V) nitride in a salt melt: 100 g of salt, salt mixture or salt hydroxide mixture are melted in the composition specified in the examples in a muffle furnace. After introducing the parent tantalum(V) nitride (VB 1) into the melt and stirring, the mixture is left at the temperature T(° C.) stated in the examples for 20 minutes. The entire crucible is then boiled out in water, and the product is filtered off and dried at 120° C.

Determination of the Color Values 0.7 g of pigment and 2 g of PVC. plastisol are mixed and dispersed in a paint refining machine. Paste coatings having a thickness of 0.3 mm are produced with a slide block; gelling is carried out for 10 minutes at 140° C. The Hunter Lab values are measured with a colorimeter (Hunterlab Labscan 5100) and the colority C (chroma value) and the color hue angle H are also determined therefrom. The measured data are converted in a known manner into the L*a*b* color values of the CIE Lab system according to DIN 5033, Part 3.

Table 2 shows the experimental conditions and also the color values L*, a*, b* and, in some cases, the Hunter chroma value of the examples. Examples B 1.2 to B 1.4 and examples B 2.1, B 2.2, B 3.1, B 3.2 and B 4 to B 6 show a powerful increase in the a* color value and an increase in the brilliance. Examples B 1.1 and also B 7 and B 8 did not lead to products according to the claims; the chroma value is increased only slightly.

TABLE 2

| Example No. | Salts (% salt 1/ % salt 2) | Temperature T (° C.) | CIE-Lab-color values | | | Hunter- chroma C |
|---|---|---|---|---|---|---|
| | | | L* | a* | b* | |
| VB | — | — | 38.3 | 40.2 | 41.1 | 38.2 |
| B 1.1 | NaNO$_3$/LiNO$_3$ (55,2/44,8) | 300 | 37.4 | 40.9 | 44.1 | |
| B 1.2 | NaNO$_3$/LiNO$_3$ (55,2/44,8) | 350 | 41.4 | 51.7 | 52.2 | 50.8 |
| B 1.3 | NaNO$_3$/LiNO$_3$ (55,2/44,8) | 400 | 42.5 | 50.9 | 52.8 | 49.9 |
| B 1.4 | NaNO$_3$/LiNO$_3$ (55,2/44,8) | 450 | 44.1 | 49.3 | 55.7 | |
| B 2.1 | KNO$_3$/LiNO$_3$ (44,1/55,9) | 400 | 42.5 | 50.6 | 48.9 | 49.9 |
| B 2.2 | KNO$_3$/LiNO$_3$ (44,1/55,9) | 450 | 47.7 | 45.1 | 59.0 | 47.9 |
| B 3.1 | NaNO$_3$ (100) | 450 | 45.6 | 45.2 | 52.1 | |
| B 3.2 | " | 400 | 43.8 | 46.7 | 55.2 | 47.4 |
| B 4 | KNO$_3$ (100) | 450 | 41.8 | 48.5 | 52.6 | 48.0 |
| B 5 | LiNO$_3$ (100) | 450 | 47.3 | 47.6 | 54.2 | 50.0 |
| B 6 | B$_2$O$_3$ (100) | 450 | 40.7 | 48.2 | 52.7 | |
| B 7 | NaNO$_3$/KOH (42/58) | 300 | 43.8 | 39.4 | 47.9 | 40.3 |
| B 8 | NaOH/KOH (42/58) | 350 | 44.3 | 39.4 | 47.2 | 40.4 |

What is claimed is:

1. A process for producing a tantalum(V) nitride pigment comprising:
   nitriding a tantalum(V) oxide, tantalum(V) oxide hydrate or tantalum(V) oxide nitride with ammonia at 500 to 1100° C. in the presence or absence of a flux to obtain a nitrided product,
   treating the nitrided product before or after washing out the optionally present flux, in a salt melt comprising one or more salts, said salt melt having a melting point in the range from 100 to 600° C. for 1 to 100 minutes at 100 to 600° C., and
   extracting the tantalum(V) nitride pigment by dissolving said one or more salts in water.

2. The process according to claim 1, wherein the salt melt comprises one or more compounds selected from the group consisting of water-soluble alkali-metal salts, water-soluble alkaline-earth-metal salts, water-soluble earth-metal salts and water-soluble alkali-metal hydroxides which are stable under melt conditions.

3. The process according to claim 1, wherein the salt melt comprises one or more compounds selected from the group consisting of alkali-metal nitrates, alkaline-earth-metal nitrates, alkali-metal carbonates, alkali-metal chlorides, alkaline-earth-metal chlorides, alkali-metal hydroxides and boron oxide.

4. The process according to claim 1, wherein the treatment in the salt melt is carried out at a temperature in the range from 300 to 500° C. for 5 to 60 minutes.

5. The process according to claim 4, wherein the treatment in the salt melt is carried out for 10 to 30 minutes.

6. The process according to claim 1, wherein tantalum(V) oxide or tantalum(V) oxide hydrate is nitrided, and the nitrided product is treated in a salt melt comprising one or more alkali-metal nitrates at 350 to 450° C. for 10 to 60 minutes.

7. The process according to claim 1, wherein the nitriding treatment is carried out in the presence of one or more water-soluble salts selected from the group consisting of alkali-metal nitrates, alkaline-earth-metal nitrates, alkali-metal chlorides, alkali-earth-metal chlorides, alkali-metal carbonates and alkali-earth-metal carbonates.

8. A process for coloring a substance, which comprises adding the tantalum(V) nitride produced according to the process of claim 1, to the substance.

9. The process for coloring according to claim 8, wherein the substance is a plastic or paint.

10. The process for coloring according to claim 8, wherein the substance is an enamel, glass or porcelain decoration.

11. A tantalum(V) nitride pigment which is produced according to the process of claim 1.

12. A process for coloring a substance, which comprises adding the tantalum(V) nitride produced according to the process of claim 6, to the substance.

13. The process for coloring according to claim 12, wherein the substance is a plastic or paint.

14. The process for coloring according to claim 12, wherein the substance is an enamel, glass or porcelain decoration.

15. A tantalum(V) nitride pigment having an a* color value of equal to or greater than +45, as defined in the CIE Lab system according to DIN 5033, Part 3, and as measured on a PVC film gelled for 10 minutes at 140° C. having a content of 26% by weight of pigment.

* * * * *